July 24, 1951 J. B. BLACK 2,561,459
LOCK FOR BLIND BOLTS
Filed April 25, 1949
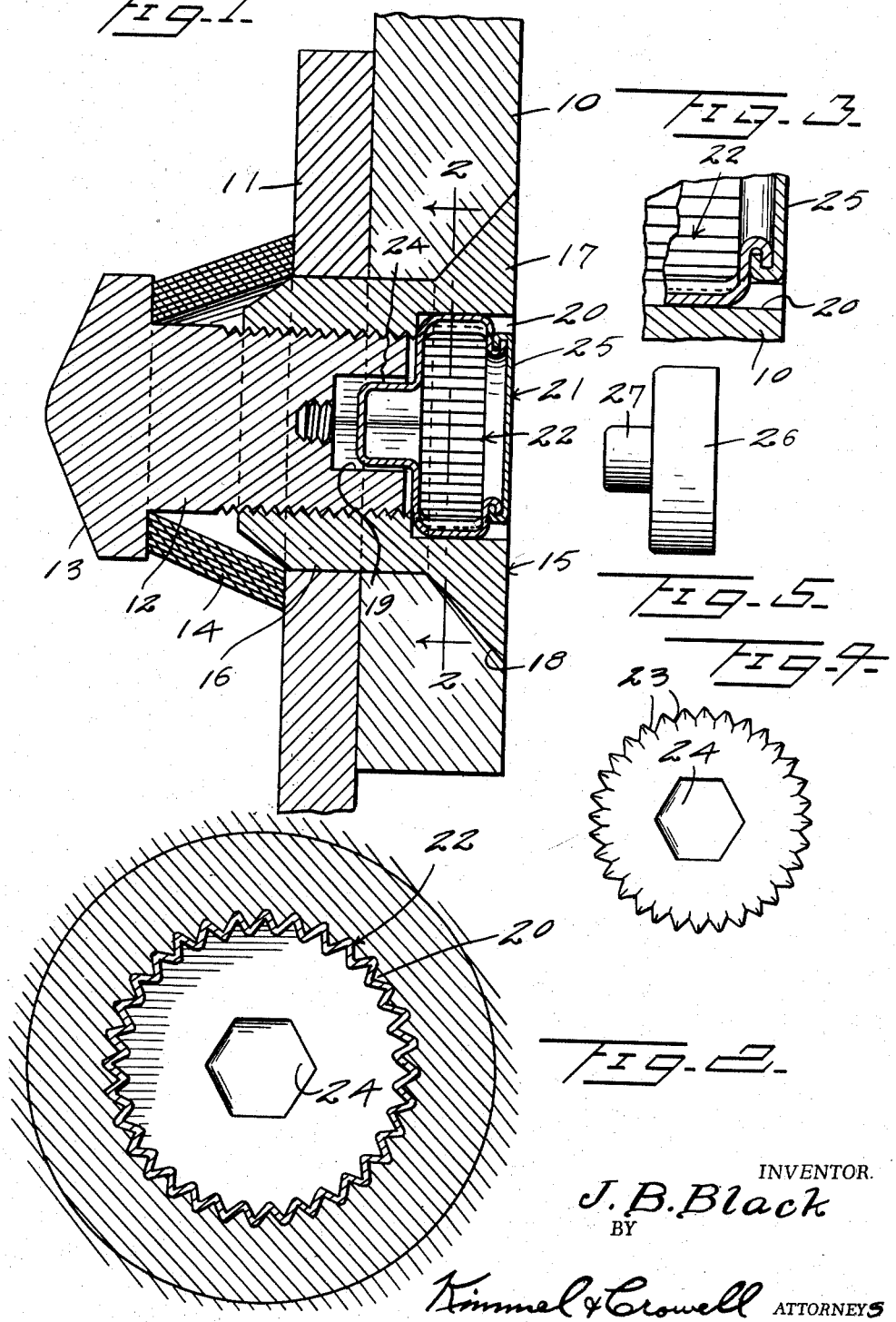
INVENTOR.
J. B. Black
BY
Kimmel & Crowell ATTORNEYS Patented July 24, 1951

2,561,459

UNITED STATES PATENT OFFICE 2,561,459

LOCK FOR BLIND BOLTS

John B. Black, Garrett, Pa.

Application April 25, 1949, Serial No. 89,521

1 Claim. (Cl. 151—8)

This invention relates to nut locks.

An object of this invention is to provide a lock for a nut used with a blind bolt, wherein the head of the nut is countersunk so that the nut and bolt cannot be turned one relative to the other.

Another object of this invention is to provide the combination of a bolt, a nut for the bolt and a locking element for locking the bolt and nut together, with the locking element having correlated means with respect to the nut and bolt whereby the nut and bolt will be securely locked together.

A further object of this invention is to provide a nut lock in the form of a peripherally splined body adapted to engage in a splined socket formed in a nut, and a polygonal stud projecting from the inner end of the body for engagement in a polygonal socket formed in the bolt. The nut lock is of such length that when positioned in the splined socket the outer end of the nut lock will be substantially flush with the outer end of the nut. Preferably the fit between the nut lock body and the nut is a tight or press fit so that the nut lock will be frictionally held against endwise movement.

A further object of this invention is to provide a nut lock which is formed of deformable material so as to automatically conform itself to the shapes of the nut and bolt sockets.

With the above and other objects in view, my invention consists in the arrangement, combination and details of construction disclosed in the drawings and specification, and then more particularly pointed out in the appended claim.

In the drawing,

Figure 1 is a vertical section of a nut lock constructed according to an embodiment of this invention, mounted in a countersunk blind bolt, Figure 2 is a sectional view taken on the line 2—2 of Figure 1, Figure 3 is a fragmentary sectional view on an enlarged scale, of the outer portion of the lock, Figure 4 is an inner end elevation of the nut lock.

Figure 5 is a detail side elevation of a modified form of nut and bolt lock.

Referring to the drawing, the numerals 10 and 11 designate generally a pair of elements which are secured together by a countersunk and blind bolt. This blind bolt includes a threaded shank 12 having a head 13 at its inner end, and a distortable frusto-conical washer 14 is positioned about the shank 12 and bears at its inner small end against the head 13.

A nut generally designated as 15 is threaded onto the shank 12 and includes a cylindrical sleeve or shank 16 which is formed with a tapered head 17 adapted to engage in a bevelled opening or recess 18 formed in the outer element 10. The shank 12 of the bolt is formed with a polygonal socket 19 at its outer end and the nut 15 is formed in the head 17 thereof with a splined socket 20.

A nut lock generally designated as 21 is pressed into the socket 20 and also into the socket 19. This nut lock 21 includes a cup-shaped member 22 formed with peripheral splines 23 engageable with the splines of the socket 20, and also includes a polygonal stud 24 engageable in the polygonal socket 19. The cup-shaped member 22 has crimped on the outer end thereof a cap or plate 25 with the outer diameter of the plate 25 slightly less than the inner diameter of the splined socket 20. When the lock is in applied position, the cap or closure 25 will be substantially flush with the outer side of the head 17.

Referring to Figure 5 there is disclosed a modified form of nut and bolt lock. A solid body 26 of cylindrical configuration has extending from one end thereof a cylindrical stud 27, and the body 26 with the stud 27 are formed of deformable material, such as lead or the like. The lock disclosed in Figure 5 is adapted to be driven or otherwise forced into the splined nut socket of nut 15, and the stud 27 is engageable in the polygonal socket 19. The material of which the lock in Figure 5 is formed is such that the lock will be deformed to the configuration of the nut and bolt sockets, and at the same time the lock will be frictionally held against removal.

In the use of this nut lock, after the nut 15 has been threaded onto the shank 12 of the bolt, the nut lock 22 is inserted into the socket 20 with the stud 24 engaging in the socket 19. The nut lock is firmly and tightly pressed into the sockets 20 and 19, the fit of the nut lock being such that it will be frictionally held against endwise movement. The splines and nut faces of sockets 20 and 19 respectively will hold the nut lock against rotation relative to the nut 15 and the bolt shank 12. This lock will also hold the nut 15 against rotation relative to the shank 12 of the bolt.

It will, of course, be understood that the socket in the head may be formed with nut faces in place of the splines and where this configuration applies, the nut lock will be shaped in the manner similar to the sockets within which the lock engages. This nut lock may be formed out of pressed or stamped metal with the cap or closure 25 crimped or otherwise firmly secured to the outer end thereof.

I do not mean to confine myself to the exact details of construction herein disclosed, but claim all variations falling within the purview of the appended claim.

What I claim is:

In a device of the character described for connecting a pair of members, a bolt having a polygonal socket formed in one end thereof and a head on the other end; a nut threadedly engaging said bolt adapted to seat flush with the surface of one of said members and having a splined socket therein and a hollow sheet metal open ended splined nut lock washer having a reduced cup shaped polygonal portion projecting therefrom adapted to seat in said first socket, said splined nut lock being engageable in said splined socket, a reverted flange on the open end of said washer and a closure cap for said open end, said cap having a peripheral reverted flange engageable with said first mentioned flange.

JOHN B. BLACK.

REFERENCES CITED

The following references are of record in the file of this patent:

UNITED STATES PATENTS

| Number | Name | Date |
|---|---|---|
| 346,476 | Henius | Aug. 3, 1886 |
| 442,642 | Roby | Dec. 16, 1890 |
| 539,917 | Kingsbury | May 28, 1895 |
| 913,712 | Dyer | Mar. 2, 1909 |
| 1,093,474 | Rolka | Apr. 14, 1914 |
| 1,185,772 | Collier | June 6, 1916 |
| 2,001,290 | Thomson | May 14, 1935 |
| 2,482,391 | Webster | Sept. 20, 1949 |